United States Patent [19]

Suzuki et al.

[11] 4,257,103
[45] Mar. 17, 1981

[54] APPARATUS FOR CONTROLLING POSITION OF A PLURALITY OF MACHINING SHAFTS EACH INCLUDING A MACHINE TOOL FITTED THERETO

[75] Inventors: Yukitomo Suzuki; Masakazu Honda, both of Hamamatsu, Japan

[73] Assignee: Heian Iron Works, Ltd., Hamamatsu, Japan

[21] Appl. No.: 960,605

[22] Filed: Nov. 14, 1978

[30] Foreign Application Priority Data

Nov. 16, 1977 [JP] Japan .............................. 52-137717
Jan. 26, 1978 [JP] Japan .................................. 53-7906
Apr. 18, 1978 [JP] Japan ................................ 53-45622

[51] Int. Cl.³ ................... G05B 19/417; G05B 11/32; G06F 15/46
[52] U.S. Cl. .................................... 364/474; 318/562; 318/625
[58] Field of Search ............... 364/474, 101, 102, 103, 364/120; 318/562, 625, 568, 569

[56] References Cited

U.S. PATENT DOCUMENTS

| | | | |
|---|---|---|---|
| 3,701,888 | 10/1972 | McDaniel | 318/562 |
| 3,757,187 | 9/1973 | Arai | 318/562 |
| 3,760,251 | 9/1973 | Posl et al. | 318/562 X |
| 3,763,360 | 10/1973 | Nishimura et al. | 318/625 X |
| 3,777,128 | 12/1973 | Kirkham | 318/562 X |
| 4,029,950 | 6/1977 | Haga | 364/474 X |
| 4,092,720 | 5/1978 | Carey | 364/474 |

Primary Examiner—Joseph F. Ruggiero
Attorney, Agent, or Firm—Fleit & Jacobson

[57] ABSTRACT

Apparatus for controlling the position of a plurality of machining shafts each including a machine tool fitted thereto so as to move each machining shaft up to its given position in response to the kind of machining to be subjected to a work piece. The apparatus comprises a memory for memorizing the position of each of the machining shafts which are different from each other in dependence with the kind of machining to be subjected to the work piece and a central processing unit for reading out data showing the position of each machining shaft from the memory in succession and generating through one servo-amplifier a signal required for moving the machining shaft corresponding to each servometer to its given position.

2 Claims, 5 Drawing Figures

APPARATUS FOR CONTROLLING POSITION OF A PLURALITY OF MACHINING SHAFTS EACH INCLUDING A MACHINE TOOL FITTED THERETO

BACKGROUND OF THE INVENTION

1. Field of the Invention

This invention relates to apparatus for controlling the position of a plurality of machining shafts each including a machine tool fitted thereto so as to move these machining shafts to positions where desired machinings are subjected to a work piece.

2. Description of the Prior Art

In a machine tool having the ability of simultaneously subjecting a plurality of different kinds (types) of machinings to one work piece, particularly in a woodworking machine, it has been the common practice to determine the position of a plurality of machining shafts including suitable machine tools for various machinings fitted thereto by moving a movable block for supporting each machining shaft up to its given position by means of a servomotor. As a result, such kind of apparatus for controlling the position of a plurality of machining shafts comprises an operating panel for appointing the position of each machining shaft, a controller for generating an electric signal corresponding to the position thus appointed, and a plurality of servo-amplifiers each generating a driving current for driving each servomotor from the output signal delivered from the controller.

Such conventional apparatus must operate so as to appoint the position of each machining shaft everytime the desired kind of machining is changed. As a result, if use is made of a number of machining shafts, the above mentioned operations take a long time and there is a risk of these operations being erroneous.

SUMMARY OF THE INVENTION

A principal object of the invention, therefore, is to provide apparatus for controlling the position of a plurality of machining shafts each including a machine tool fitted thereto which can set all of the machining shafts to their respective given positions by merely appointing the desired kind of machining.

The control apparatus according to the invention comprises a memory for memorizing the positions of all of machining shafts for each kind of machining operation, and a central processing unit for supplying data to the memory and reading out data from the memory. The central processing unit functions to read out from the memory data showing the positions of all of the machining shafts for machining operations whose kind is appointed by an operating panel. As a result, the kind of the machining operations can be changed by merely selecting a new kind of machining operation.

The central processing unit constitutes a closed loop including a controller, servo-amplifier, servomotors and signal generators for generating signals showing the position of the servomotors. In the closed loop, the operation for rotating the servomotor for a given angle is effected. The closed loop includes further a selection switch for selecting one of a plurality of servomotors in succession. This selection switch is controlled by the output signal from the central processing unit such that the servomotor corresponding to the position data of the machining shaft which is read out from the memory by means of the central processing unit is selected.

In addition, the invention provides a method of controlling the position of machining shafts of machine tools which can move the machining shafts up to predetermined correct positions.

Further objects and advantages of the invention will be fully understood from the following detailed description with reference to the accompanying drawings.

DESCRIPTION OF THE PREFERRED EMBODIMENTS

Figure 1:
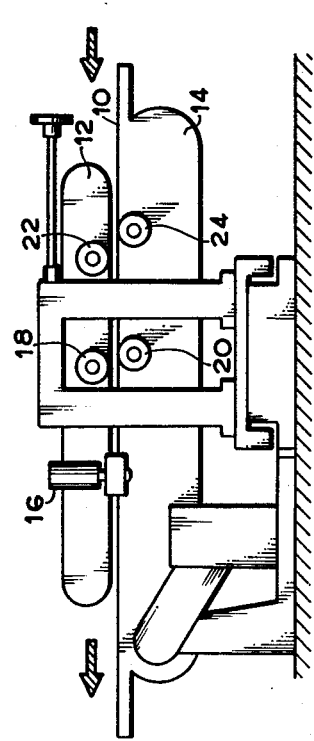
FIG. 1 is a diagrammatic side elevational view of a control apparatus according to the invention applied to a double-ended tenoner.

FIG. 1 shows a control apparatus according to the invention applied to a double-ended tenoner. The tenoner is composed of a table 10 for supporting a work piece thereon and a pair of conveyors 12 and 14 arranged on and beneath the table 10 and moving the work piece at a given speed in a direction shown by an arrow, for example. By the table 10 are supported a plurality of machining shafts 16, 18, 20, 22, 24 each including a machine tool such as a circular saw, planer or the like selected in accordance with the kinds of desired machinings to be subjected to the work piece. These machining shafts are controlled by means of a control device according to the invention to be described later such that these machining shafts are urged against the work piece for the purpose of effecting respective given machinings at respective given positions.

Figure 2:
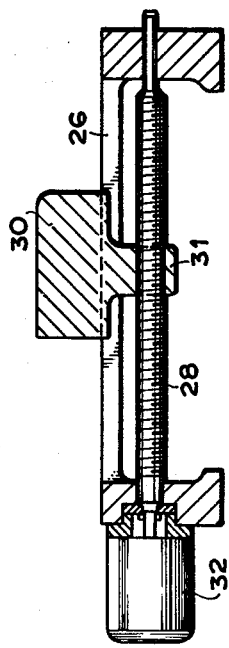
FIG. 2 is a longitudinal cross-sectional view of a mechanism for moving a movable block for supporting one of machining shafts of the tenoner shown in FIG. 1.

FIG. 2 shows a mechanism for moving each machining shaft to its given position. The mechanism shown in FIG. 2 comprises a frame 26 secured to the table 10, a shaft 28 rotatably journaled in the frame 26 and provided at its peripheral surface with screw threads and a movable block 30 movably supported by means of the frame 26 and the screw threaded shaft 28, the movable block 30 being provided with a downwardly extending portion 31 having a tapped hole threadedly engaged with the screw threaded shaft 28. As a result, if the screw threaded shaft 28 is rotated in one or the opposite direction, the movable block 30 is moved for a distance corresponding to the rotated angle of the screw threaded shaft 28 in a direction corresponding to the rotating direction of the screw threaded shaft 28. In order to rotate the screw threaded shaft 28, provision is made for a servomotor 32 secured to the frame 26. The movable block 30 serves to support one of the machining shafts, so that the rotation of the servomotor 32 causes the machining shaft to change its position.

Figure 3:
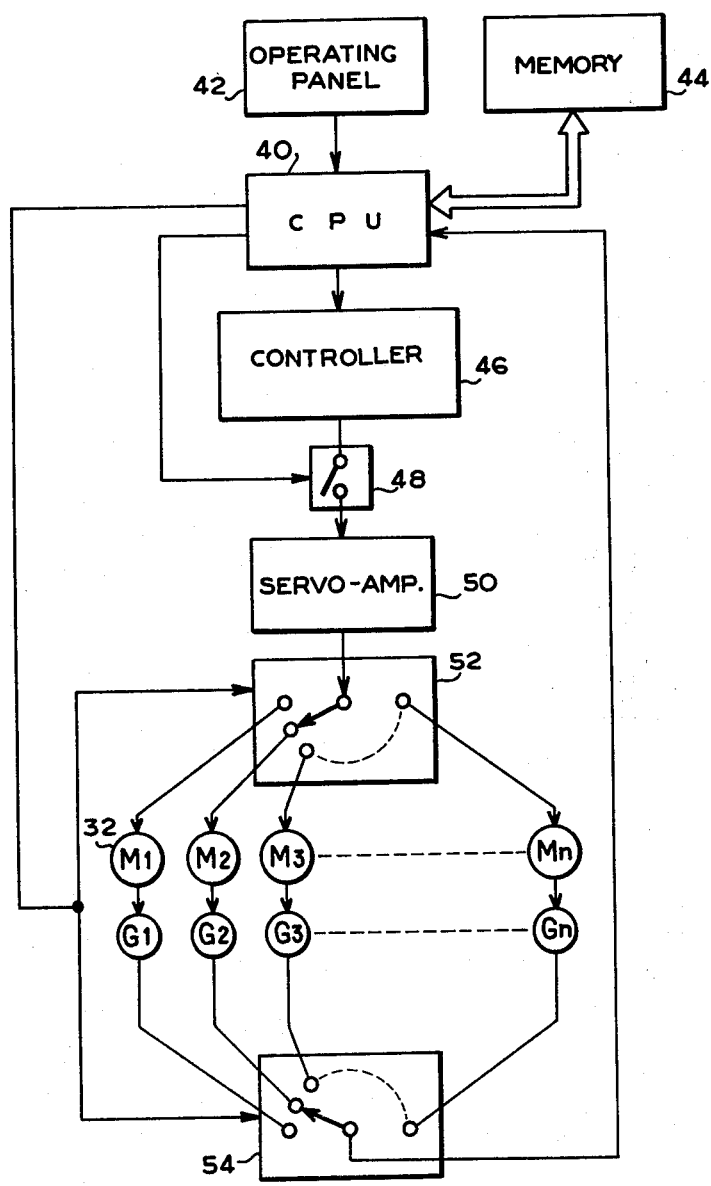
FIG. 3 is a block diagram of apparatus for controlling the position of the machining shaft of a machine tool according to the invention shown in FIG. 1.

FIG. 3 shows a control device according to the invention including a plurality of servomotors 32. The control device shown in FIG. 3 comprises n servomotors 32 (n is a positive integer larger than 1) designated by $M_1, M_2, \ldots M_n$, respectively. A central processing unit (CPU) 40 shown in FIG. 3 functions to receive a signal from an operating panel 42 or memory 44 when at least one position of each machining shaft must be changed and generates a signal for rotating a selected servomotor for a required angle in a required direction. This signal is supplied through a controller 46 and switch 48 to a servo-amplifier 50. The servo-amplifier 50 functions to receive the signal from the controller 46 when the switch 48 is closed and supply it through a selection switch 52 to one of the servomotors $M_1$ to $M_n$. As a result, the rotary shaft of the selected servomotor is rotated for a required angle in a given direction so as to move the machining shaft to its given position. In addition, to the servomotors $M_1$ to $M_n$ are connected signal generators $G_1$ to $G_n$ such as rotary encoders which function to detect the position of each rotary shaft and generate a position signal. This position signal is supplied through a selection switch 54 to the CPU 40. The switch 48 is controlled by a control signal delivered from the CPU 40 such that the switch 48 becomes open or closed in response to the control signal. The selection switches 52 and 54 are controlled by a control signal delivered from the CPU 40 so as to select one of the servomotors $M_1$ to $M_n$ and hence that signal generator which is connected to the servomotor thus selected.

In the case of starting the position determining operation of each machining shaft and hence moving each machining shaft to a given position, in the first place the operating panel 42 is operated to select one of the machining shafts and then the servomotor is rotated so as to set the machine tool fitted on the selected machining shaft to a given position for the work piece. Similar position determining operations are effected for all of the other machining shafts so as to set all of the machine tools to respective positions suitable for effecting a given machining operation for the work piece. The position signals delivered from the signal generators $G_1$ to $G_n$ connected to the servomotors $M_1$ to $M_n$, respectively, are supplied to the CPU 40 where the position signals are subjected to required processing treatments and then supplied to given addresses of the memory 44 and stored in succession. The stored signal is used for the purpose of setting up each machining shaft to its original position.

In the preferable embodiment of the invention, the memory 44 is composed of a random access memory having a memory capacity which is sufficient to memorize the position of each machine tool used at each of a plurality of machining operations. The data showing the position of the machine tool at each machining operation together with discrimination symbol showing the kind of the machining operation are written into the memory 44.

The following Table 1 shows one example of the pattern of the data written into the memory 44.

TABLE 1

| Kind of operation | Machining Shaft No. | | | | | | |
|---|---|---|---|---|---|---|---|
| | 1 | 2 | 3 | 4 | ----- | (n-1) | n |
| A | O | O | - | O | ----- | - | - |
| B | O | - | - | O | ----- | - | O |
| C | - | O | O | - | ----- | O | - |
| D | O | O | O | - | ----- | O | - |
| ⋮ | ⋮ | ⋮ | ⋮ | ⋮ | | ⋮ | ⋮ |
| N | - | - | O | O | ----- | O | - |

In the above Table 1, a mark O shows a digital code for showing the position of each machining shaft and a mark - shows an absence of such digital code.

In the case of carrying out practical machining operations, the kind of operations shown by A, B, C, ... N in Table 1 is selected by the operating panel 42 and a signal produced by such selection operation is supplied to the CPU 40. The CPU 40 functions to read out position data for each machining shaft with respect to the selected kind of operation from the memory 44 and supply the read out position data to the controller 46. At the same time, the CPU 40 functions to supply a control signal to the switch 48 and selection switches 52, 54 in association with the reading out operation of the position data. The selection switches 52, 54 are interlocked with each other upon receipt of every control signal so as to effect their change-over operations.

When the CPU 40 is reading out the position data of the machining shaft No. 1, the selection switch 52 functions to select the servomotor $M_1$ and the selection switch 54 functions to detect the output from the signal generator $G_1$ and supply it to the CPU 40.

The CPU 40 functions to compare the position signal read out from the memory 40 with the position signal delivered from the signal generator $G_1$ and supply a signal having a code corresponding to a code of difference, if any, between both the position signals to the controller 46. The controller 46 functions to detect the code of the difference signal delivered from the CPU 40 to produce a positive or negative code signal which is supplied through the switch 48 to the servo-amplifier 50. The servo-amplifier 50 functions to supply a driving current for rotating the rotary shaft of the servomotor $M_1$ in a direction corresponding to the code of the output signal from the controller 46 to the servomotor $M_1$. The servomotor $M_1$ is rotated in such direction that the output signal from the signal generator $G_1$ approaches to the position signal read out from the memory 44 until both signals become equal with each other so as to stop the servomotor $M_1$. If the servomotor $M_1$ is stopped, the CPU 40 functions to supply a control signal to the selection switch 52 so as to select the servomotor $M_2$ and signal generator $G_2$ and subsequently read out a position signal of a machining shaft No. 2. Under such condition, the position control operation for the servomotor $M_2$ is carried out in the same manner as in the case of the servomotor $M_1$. A similar operation will be carried out for the other servomotors $M_3$ to $M_n$.

When the position control operations for all of the servomotors $M_1$ to $M_n$ have been completed, the machining shafts Nos. 1 to n are set up to positions suitable for carrying out selected kinds of machining operations. This set up operation is automatically repeated everytime a particular kind of machining operation is selected.

The switch 48 inserted between the controller 46 and the servo-amplifier 50 functions to prevent the signal supplied to the servomotor and the position signal supplied to the CPU 40 from being subjected to a bad influence by signal disturbance due to chattering or the like produced during the change-over operation of the selection switches 52, 54.

The CPU 40 functions to cut off the signal to be supplied to the controller 46 prior to generation of the control signal for changing over the selection switches 52, 54, and then to supply the control signal to the switch 48 so as to make it open. After a lapse of suitable time, for example, 0.2 to 0.3 second from the opening of the switch 48, the CPU 40 functions to supply the control signal to the selection switches 52, 54. In addition, the CPU 40 functions to effect the sequence of operations so that the switch 48 is closed after the change-over operations of the selection switches 52, 54 have been completed, and after a lapse of suitable time from the closing of the switch 48 the output from the CPU 40 is supplied to the controller 46. This sequence of operation of the CPU 40 causes it to supply no signals therefrom during a time from immediately before the start of operating the switch 48 and selection switches 52, 54 to immediately after the completion of such operation. As a result, the CPU 40 can prevent an erroneous operation due to the chattering of these switches and also prevent a position error.

The above mentioned operations of the switch 48 and selection switches 52, 54 make it possible to exchange the servomotors and signal generators, if necessary, in a closed loop including the CPU, controller, servomotors and signal generators. That is, even though a number of pairs of servomotors and signal generators are used, it is only necessary to use one controller and one servo-amplifier. As a result, the apparatus according to the invention is simple in construction and less expensive if compared with conventional apparatus comprising a number of controllers and servo-amplifiers for respective servomotors and signal generators.

A mechanical play between the rotary shaft of the servomotor and the machining shaft will now be considered. Referring again to FIG. 2, the angle of the rotary shaft of the servomotor 32 is not precisely reflected in the position of the movable block 30, that is, in the position of the machining shaft supported by the movable block 30, owing to the play which is inevitably present between the screw threaded shaft 28 and the movable block 30.

In order to rapidly move the movable block 30 from one position to the other position and to correctly stop it at a desired position, it is desirous to control the rotary shaft of the servomotor 32 such that the rotary shaft is started by a torque which is sufficiently large to overcome the resistance of the screw threaded shaft 28 due to viscosity of lubrication oil, that after the starting operation the rotary shaft is rotated at a high speed until the movable block 30 approaches to its desired stop position, and that at a substantially predetermined stop position the rotary shaft is rotated at such low speed that no overshoot thereof occurs.

The invention is also intended to provide a method of controlling the position of the machining shaft of a machine tool which can satisfy the above mentioned requirements.

The method of controlling the position of the machine shaft of a machine tool according to the invention will now be described with reference to FIGS. 4 and 5 which show the case in which the movable block for supporting the machining shaft tends to move along the axial direction of its driving shaft in one direction.

Figure 4:
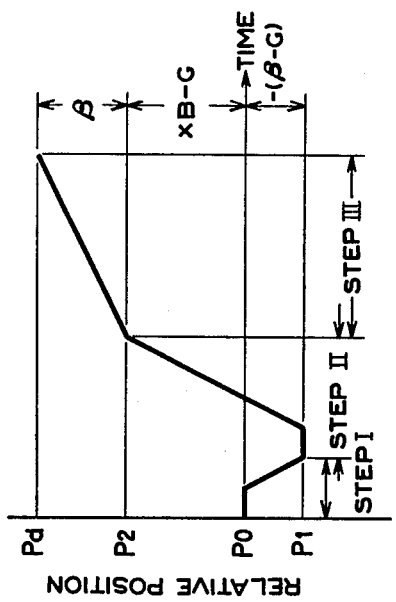
FIGS. 4 and 5 are graphs showing the relation between position and time when the movable block is moved from one of the positions to another position.
Figure 5:
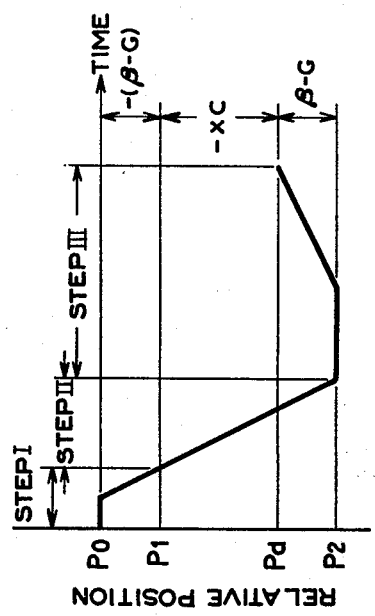

FIG. 4 shows the relation between the position and time when the movable block is moved in that direction in which the movable block per se tends to move (hereinafter referred to as "forward direction"), while FIG. 5 shows the relation between the position and time when the movable block is moved in a backward direction which is opposite to the forward direction shown in FIG. 4.

In FIG. 4, step I shows a time in which the rotary shaft of the servomotor is rotated in the backward direction. In this time, after starting the rotation of the rotary shaft of the servomotor, the movable block remains at its original position until the play between the movable block and the rotary shaft becomes zero. Then, the movable block starts to move in the backward direction which is opposite to its desired moving direction. This movement of the movable block continues until the rotation of the rotary shaft becomes stopped and causes the movable block to move from its original position $P_0$ to a position $P_1$ in that direction which is opposite to the desired direction. In step II, subsequent to step I, the rotary shaft of the servomotor is rotated in such direction that the movable block is moved toward a desired position $P_d$. After such reversal of the rotation of the rotary shaft of the servomotor, the movable block remains at the position $P_1$ until the play between the movable block and the rotary shaft becomes zero. Then, the movable block rapidly moves toward the position $P_d$ at a speed which is proportional to the rotary speed of the rotary shaft of the servomotor. When the movable block reaches a position $P_2$ near the final position $P_d$, step II is completed to begin a subsequent step III. In step III, the rotating speed of the rotary shaft of the servomotor is decreased to a value that can prevent the overshoot of the rotary shaft due to the inertia of the mass of the movable block. As a result, the movable block slowly moves from the position $P_2$ toward the final position $P_d$ where the movable block is stopped.

The desired amount of movement of the movable block is the distance from the initial position $P_0$ to the final position $P_d$. In practice, however, at the beginning of the movement, the movable block moves backwardly from the position $P_0$ to the position $P_1$. As a result, the rotary shaft of the servomotor must be rotated for that angle which is required for moving the movable block over a distance which is obtained by adding together, in steps II and III, the amount of movement of the movable block in step I and the amount of the desired movement of the movable block.

Let the rotary angle of the rotary shaft of the servomotor in the reverse direction in the step I be $\beta$ and the rotary angle of the rotary shaft of the servomotor required for absorbing the play between the rotary shaft and the movable block be G, then the amount of movement of the movable block from the position $P_0$ to the position $P_1$ is given by $-(\beta-G)$. In addition, let the rotary angle of the rotary shaft of the servomotor required for moving the movable block over a desired distance from the position $P_0$ to the position $P_d$ be xB, then if the rotary shaft is rotated for xB in step II, the amount of movement of the movable block in step II is given by (xB−G). If the movable block is forwardly moved in step III for the rotary angle $\beta$, the total amount of movement of the movable block is given by the following equation (1).

$$-(\beta-G)+(x\beta-G)+\beta=x\beta \qquad (1)$$

The above equation (1) shows that if the rotary shaft of the servomotor is rotated for an angle corresponding to the distance $\beta$ in the reverse direction and then is forwardly rotated for an angle corresponding to the distance $(xB+\beta)$, the play between the rotary shaft and the movable block is absorbed, and that the movable block is precisely moved for the desired distance xB in the forward direction. It should be noted that if the movable block arrives at the desired final position, the play between the rotary shaft of the servomotor and the movable block must not function to move the movable block in the backward direction. As a result, it is possible to hold the movable block at the desired position during the machining operation and to make clear the starting point for the subsequent movement of the movable block.

FIG. 5 shows the relation between the position and time when the movable block is moved in the backward direction. The case shown in FIG. 5 is similar to the case shown in FIG. 4 except that the moving direction of the movable block in step II is opposite to that in the case shown in FIG. 4. The desired amount of movement xC of the movable block is given by the following equation (2).

$$-(\beta - G) - xC + (\beta - G) = -xC \qquad (2)$$

Both the equations (1) and (2) are satisfied when $\beta$ is larger than G. In wood-working machines in general, the play G has a dimension on the order of 0.3 to 0.6 mm. As a result, it is preferable to make the value of $\beta$ larger than the above value of the play G, for example about 2 mm. The above mentioned control for the rotary direction, angle and speed of the rotary shaft of the servomotor can easily be effected by supplying pulses having a desired frequency from the CPU 40 shown in FIG. 3 to the controller 46.

The rotation of the rotary shaft of the servomotor in the backward direction at the beginning of the movement of the movable block causes the rotary shaft to rotate under substantially no load condition until the play G becomes zero. As a result, it is possible to rapidly start the rotation of the rotary shaft in a smooth manner. In addition, the movable block moves at a low speed in the forward direction in step III irrespective of the moving direction thereof in step II, so that it is possible to prevent occurrence of the overshoot of the rotary shaft when the movable block stops at the desired position $P_d$. In addition, during the movement of the movable block at low speed, it is possible to absorb the overshoot of the rotary shaft which has eventually been induced in the previous step.

What is claimed is:

1. A setup apparatus for use with a wood-working machine for controlling positions of multiple machining shafts to which machine tools are selectively fitted, comprising:
    servomotor means for moving each of said machining shafts, and comprising a plurality of servomotors, each driving at least one of said multiple machining shafts, and each having an input terminal;
    signal generator means, comprising a plurality of signal generators, one for each of said plurality of servomotors and corresponding thereto, for detecting said positions of said multiple machining shafts and for generating position signals corresponding thereto;
    first selection switch means responsive to setup operation of said servomotors, moving corresponding said machining shafts to setup positions, resulting in generation of setup position signals by said signal generator means in correspondence to said setup positions, for selecting, in succession, the setup position signals from said signal generator means, and for providing same, in succession, as successive setup position signal outputs;
    memory means, responsive to said successive setup position signal outputs from said first selection means, for memorizing the setup position signals generated by said signal generator means in correspondence to said setup positions together with an information showing the kind of each machining operation, as setup position data;
    operating panel means for selecting a desired machining operation;
    central processing means for reading out, in succession, from said memory means said setup position data of each machining shaft for the desired machining operation selected by said operating panel means, and for producing successive control signals successively designating corresponding said servomotors;
    controller means for generating output signals based on the setup position data read out by said central processing means;
    servo-amplifier means having an output terminal and responsive to the output signals from said controller means for generating, at the output terminal thereof, an output signal which controls the operations of said servomotors; and
    second selection switch means responsive to said successive control signals generated by said central processing means for selectively connecting the output terminal of said servo-amplifier means to the input terminal of said successively designated servomotors, each said servomotor being thus controlled so as to move said at least one of said multiple machining shafts to said setup positions.

2. The apparatus according to claim 1 and comprising further a switch inserted between said controller means and said servo-amplifier means and held at its open condition by a control signal delivered from said central processing means for a lapse of time from a state in which said central processing means has delivered a position data required for moving one of the machining shafts to its desired position to a state in which a subsequent machining shaft is selected.

* * * * *